J. H. COVINGTON.
POTATO PLANTER.
APPLICATION FILED APR. 15, 1919.
1,326,711.
Patented Dec. 30, 1919.
2 SHEETS—SHEET 1.
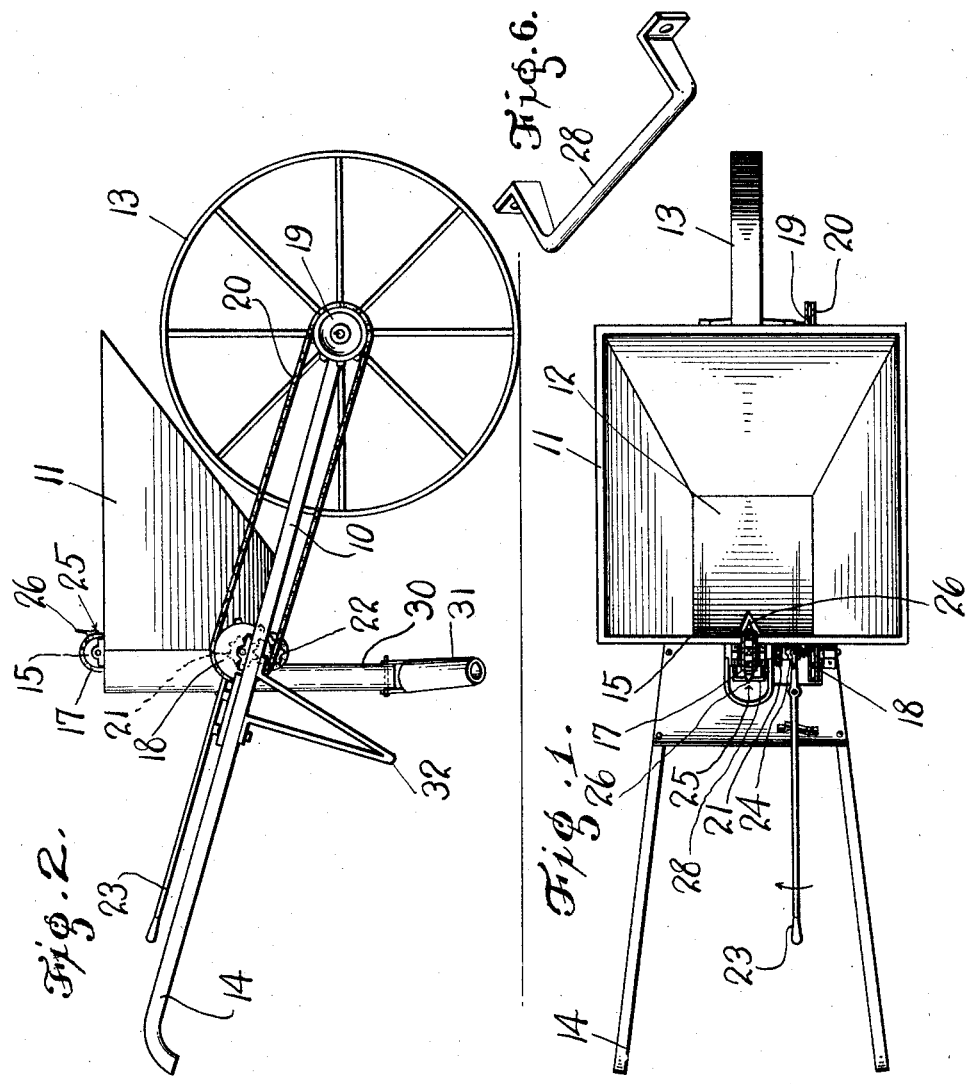
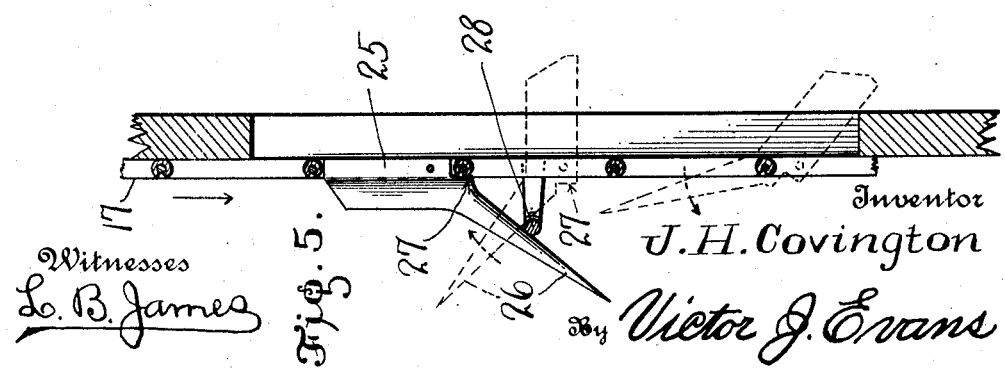
Witnesses
L. B. James
Inventor
J. H. Covington
By Victor J. Evans
Attorney

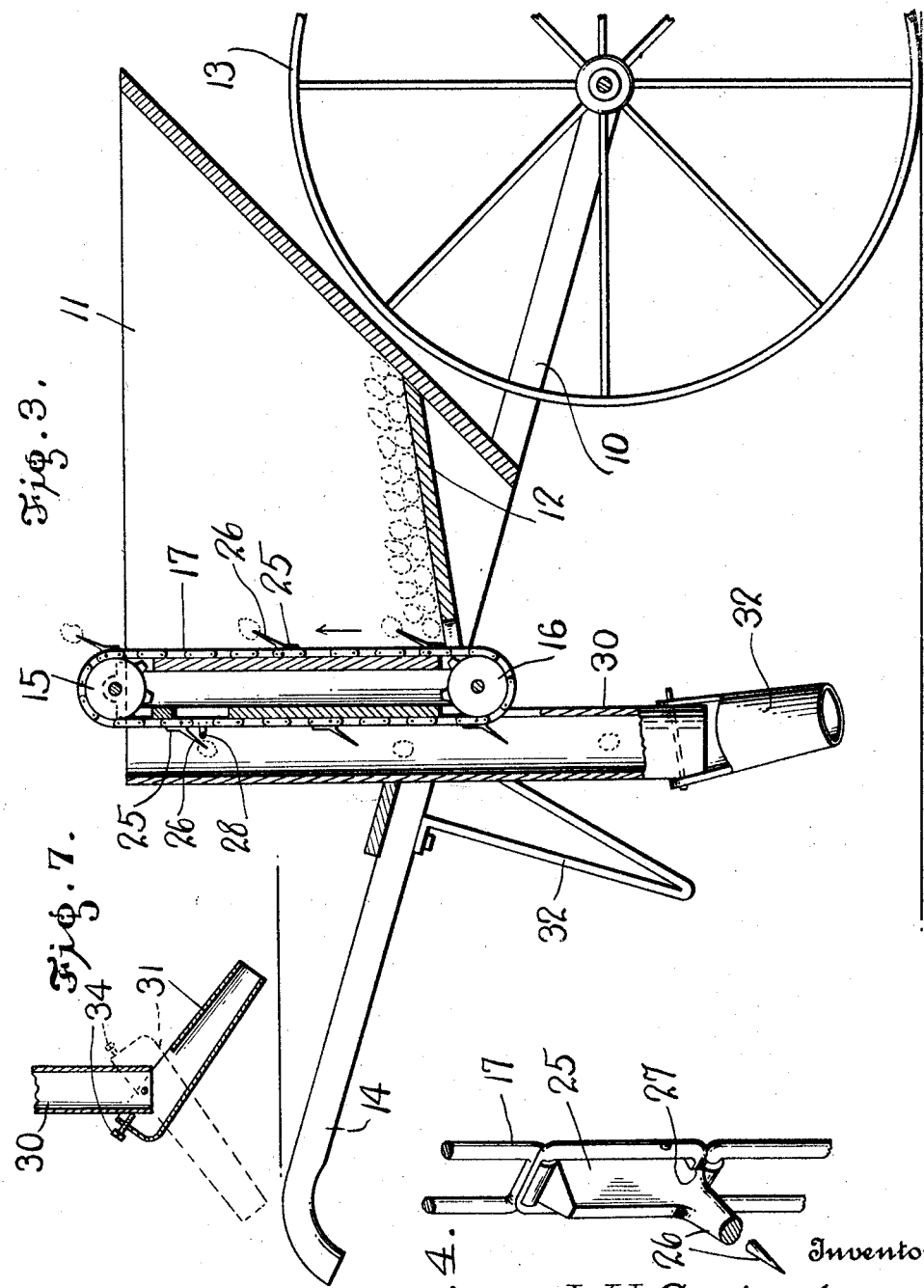

UNITED STATES PATENT OFFICE.

JAMES HARRY COVINGTON, OF RICHARDSON PARK, DELAWARE.

POTATO-PLANTER.

1,326,711.  Specification of Letters Patent.  Patented Dec. 30, 1919.

Application filed April 15, 1919. Serial No. 290,237.

*To all whom it may concern:*

Be it known that I, JAMES HARRY COVINGTON, a citizen of the United States, residing at Richardson Park, in the county of New Castle and State of Delaware, have invented new and useful Improvements in Potato-Planters, of which the following is a specification.

This invention comprehends the provision of a potato planter adapted to drop or plant the potatoes in a furrow made by a plow which it follows, the invention embodying means whereby the potatoes can be planted either to the right or to the left depending whether it follows a right or left handed plow.

In carrying out my invention, I provide means operable simultaneously with the movement of the planter, for singly conveying the potatoes from a hopper to a chute, from which they are dropped or planted in the furrow made by the plow which the planter follows.

To this end, the invention embodies among other features, a discharge chute made up of a fixed section and a freely pivoted section, together with means for holding the pivoted section in different angular positions with regard to the fixed section so that the potatoes may be directed into the furrow from either the right or left of the fixed section of the chute, depending upon whether the planter follows a right or left handed plow.

Most specifically stated, the means employed for conveying the potatoes from the hopper to the chute embodies an endless conveyer having a plurality of pickers freely pivoted thereon and adapted to normally assume a position to singly remove the potatoes from the hopper, means being employed for tripping the pickers as they pass through the chute whereby the potatoes are removed therefrom, and subsequently directed by the chute to their position in the ground.

Other objects and advantages will appear as the nature of the invention is better understood from the following detailed description when taken in connection with the accompanying drawings, the invention residing in the construction, combination and arrangement of parts as claimed.

In the drawings forming part of this specification, like numerals of reference indicate similar parts in the several views and wherein:

Figure 1 is a top plan view.

Fig. 2 is a side elevation.

Fig. 3 is a vertical sectional view.

Fig. 4 is an enlarged view of one of the pickers showing its normal position upon the conveyer.

Fig. 5 is a sectional view showing the various operating positions of the picker.

Fig. 6 is a detail view of one of the trip elements.

Fig. 7 is a detail view showing the reversed positions of the pivoted section of the chute for planting either to the right or to the left of the latter, and the means employed for holding the pivoted section in a given position.

Referring more particularly to the drawings in detail, 10 indicates a frame upon which is mounted the hopper 11 adapted to contain the potatoes to be planted and including an inclined bottom 12. A ground engaging wheel 13 is journaled at the forward end of the frame 10, or the opposite end of the frame is provided with handles 14, whereby the planter in its entirety can be conveniently moved over the ground. Arranged at the rear of the hopper 11 is a vertically disposed discharge chute from which the potatoes are dropped or planted in the ground, subsequent to being singly transferred from the hopper to the chute in the manner to be presently described.

Arranged adjacent the top and bottom of the hopper 11 are the sprocket wheels 15 and 16 respectively, over which is trained the endless conveyer 17, the parallel runs of the conveyer passing vertically through both the hopper 11 and the discharge chute at the rear thereof. Journaled upon the frame 10 is a sprocket wheel 18 over which and a similar wheel 19 fixed to the axis of the ground wheel 13, is trained a chain 20, whereby the sprocket wheel 18 is rotated simultaneously with the movement of the planter as will be readily understood. Associated with the sprocket wheel 18 is a cog 21 meshing with a cog 22 fixed upon the same shaft with the sprocket wheel 16, so that the endless conveyer 17 will be continuously driven during the movement of the planter over the ground or surface. A manually operable lever 23 controls a clutch 24 which when in an inactive position permits the planter to be moved over the ground or surface without imparting any movement to the conveyer 17 as will be readily understood.

Forming a part of the endless conveyer is a plurality of pickers which are utilized to engage the potatoes as they pass through the hopper and transfer the potatoes to the discharge chute. Each of the pickers includes a body portion 25 of a size to nicely fit within one of the links of the conveyer 17, while projecting at an angle from the body portion 25 is a pointed spur or projection 26. The body portion 25 is pivoted at a point adjacent its lower edge with the link of the conveyer with which it is associated, while the body portion is formed with a shoulder 27 at its lower end to engage the adjacent end of said link to limit the pivotal movement of the picker in one direction. Upon reference to Fig. 3 of the drawing, it will be noted that the normal position of the pickers are such that the body portion 25 lies parallel with the link with which it is associated, while the pointed spur of each picker extends at an angle in an upward direction as they enter the hopper 11 through an opening in the bottom thereof. In practice, the pickers assuming this position enter the hopper through an opening in the bottom and successively penetrate the potatoes contained therein and singly move the latter from the hopper into the discharge chute disposed at the rear thereof. As the pickers enter the discharge chute, each carrying a potato on the pointed spur 26, the positions of the pickers are of course reversed. In other words, as the pickers start on their course through the discharge chute, the pointed spurs project downwardly.

Disposed within the discharge chute at a point adjacent the upper end thereof, is a trip 28 occupying a position in the path of the pickers, so that each picker as it engages the trip 28 will be moved upon its pivot to reverse the position thereof, from which position the potato carried by the pointed spur will be easily removed from the latter by means of the trip 28. The trip 28 as shown in Fig. 6 comprises a substantially U-shaped bar which may be secured in any suitable manner in the discharge chute, although I desire to have it understood that any suitable means may be employed for tripping the pickers in the manner described for the purpose mentioned. A better understanding of the operation of the pickers may be had from an inspection of Fig. 5 of the drawing, wherein it will be noted that as the picker approaches the trip 28 contacting the latter, the trip is initially swung to the position indicated by dotted lines. During the continued movement of the picker through the discharge chute, the trip 28 forces the picker into a position exactly reverse from that occupied by the picker when it enters the chute, which reverse position is clearly indicated in Fig. 5, wherein the body portion 25 projects downwardly, while the pointed spur 26 extends in an upward direction. As the trip 28 is in continuous engagement with the pointed spur 26 until the picker is completely reversed, it is manifest that the potato carried by the pointed spur is forced from the latter to be engaged by the chute to its position in the ground. As hereinabove stated, the body portion 25 is formed with a shoulder 27 which engages the conveyer 17 in a manner to limit the pivotal movement of the picker in one direction, thus assuring the position of the picker prior to entering the hopper 11 through an opening in the bottom thereof.

It is of course understood that the planter is intended to follow a plow, and drop or plant the potatoes in the furrow made by the plow, it being a well known fact that farmers can raise larger crops by plowing their potatoes in. In order that the planter may follow either a right or left handed plow, and deposit the potatoes in the furrow made thereby, I construct the discharge chute with a fixed section 30 and a movable section 31. The movable section is comparatively small, and freely pivoted upon the lower end of the fixed section 30, so that when the planter is lowered to rest upon its stationary support 32, the movable section 31 contacts the ground and is elevated thereby so as not to bear any of the weight of the planter. Manifestly, should the planter be used behind a right handed plow, it would be necessary to dispose the movable section 31 of the chute in angular relation to the fixed section, to convey the potatoes into the furrow made by the plow at the right of the fixed section 30. As the movable section is freely pivoted for the purpose above mentioned, I employ a suitable means to limit the fall or downward movement of the movable section with respect to the fixed section. In Fig. 7, I have illustrated one of many ways in which this may be accomplished, in which instance a set screw 34 is carried by the movable section 31 and disposed to engage the fixed section 30. The angular position of the movable section 31 with respect to the fixed section 30 can be varied by adjusting the screw 34. Now, when it is desired to use the planter behind a left handled plow, it is necessary to reverse the angular position of the movable section 31 with respect to the fixed section 30, or in other words dispose the movable section so that it will project toward the left of the fixed section 30. While this may be accomplished in any suitable manner, it is in this specific instance intended to remove the pivot for the movable section 31 to permit the latter to be turned in the proper direction with regard to the fixed section 30, subsequent to which the pivot is again used to hold the parts associated. The planter is very easy to manipulate, being positive of operation and will accomplish the work ordinarily requiring the services of two or three persons.

While I have shown and described what I consider the preferred embodiment of the invention, I desire to have it understood that what is herein shown and described is merely illustrative; that I do not limit myself to this exact construction and arrangement as such changes may be resorted to when desired as fall within the scope of what is claimed.

What I claim is:—

1. A potato planter comprising a hopper, a discharge chute, an endless conveyer movable through the hopper and chute, means for operating the conveyer, a plurality of pivoted pickers forming part of said conveyer and adapted to transfer the potatoes from the hopper to the chute, and means disposed within the chute for removing the potatoes from the pickers as the latter pass therethrough.

2. A potato planter comprising a hopper, a discharge chute, an endless conveyer movable through the hopper and chute, means for operating the conveyer, a plurality of pivoted pickers forming part of said conveyer, and adapted in one position to singly transfer the potatoes from the hopper to the chute, means disposed within the chute for reversing the position of said pickers to remove the potatoes therefrom as the pickers pass through the chute, and means whereby the pickers are returned to normal position after the potatoes are removed therefrom.

3. A potato planter comprising a hopper, a discharge chute, an endless conveyer movable through said hopper and chute and operable to transfer the potatoes from the hopper into the chute, said chute including a fixed section and a movable section, the movable section being pivoted upon the lower end of the fixed section to discharge the potatoes to either right or left of the chute, a flange formed on one end of the movable chute, and an adjusting element associated with said flange and coöperating therewith to engage the adjacent end of the fixed section, whereby the movable section is held at the proper inclination with respect to the fixed section for the purpose specified.

In testimony whereof I affix my signature.

JAMES HARRY COVINGTON.